United States Patent

[11] 3,593,431

| [72] | Inventors | Pasquale A. Candido<br>13 Prospect Ave., Brentwood, N.Y. 11717;<br>Elliott Manketo, Farm Road Head of the<br>Harbor, St. James, N.Y. 11780 |
|---|---|---|
| [21] | Appl. No. | 815,644 |
| [22] | Filed | Apr. 14, 1969 |
| [45] | Patented | July 20, 1971 |

[54] EDUCATIONAL CARD-READING TOY APPARATUS
7 Claims, 12 Drawing Figs.

[52] U.S. Cl. .................................................. 35/8 R,
35/35 D, 35/75
[51] Int. Cl. ...................................................... G09b 1/04
[50] Field of Search .......................................... 35/9, 8,
35.4, 48, 75

[56] References Cited
UNITED STATES PATENTS
| 2,586,564 | 2/1952 | Rinde .......................... | 35/9 |
| 3,146,534 | 9/1964 | Brown et al. .................. | 35/35 (.4) |

*Primary Examiner*—Wm. H. Grieb
*Attorney*—Polachek & Saulsbury

ABSTRACT: This toy has a plurality of cards inscribed with pictures of figures such as animals. Each card has a plurality of projections of different lengths. A card-reading device has rotatable discs with letters at their edges exposable at windows in the device. When a card is inserted in the device, the discs rotate and the name of the figure on the card appears at the windows. The device has lamps arranged to illuminate the letters appearing at the windows.

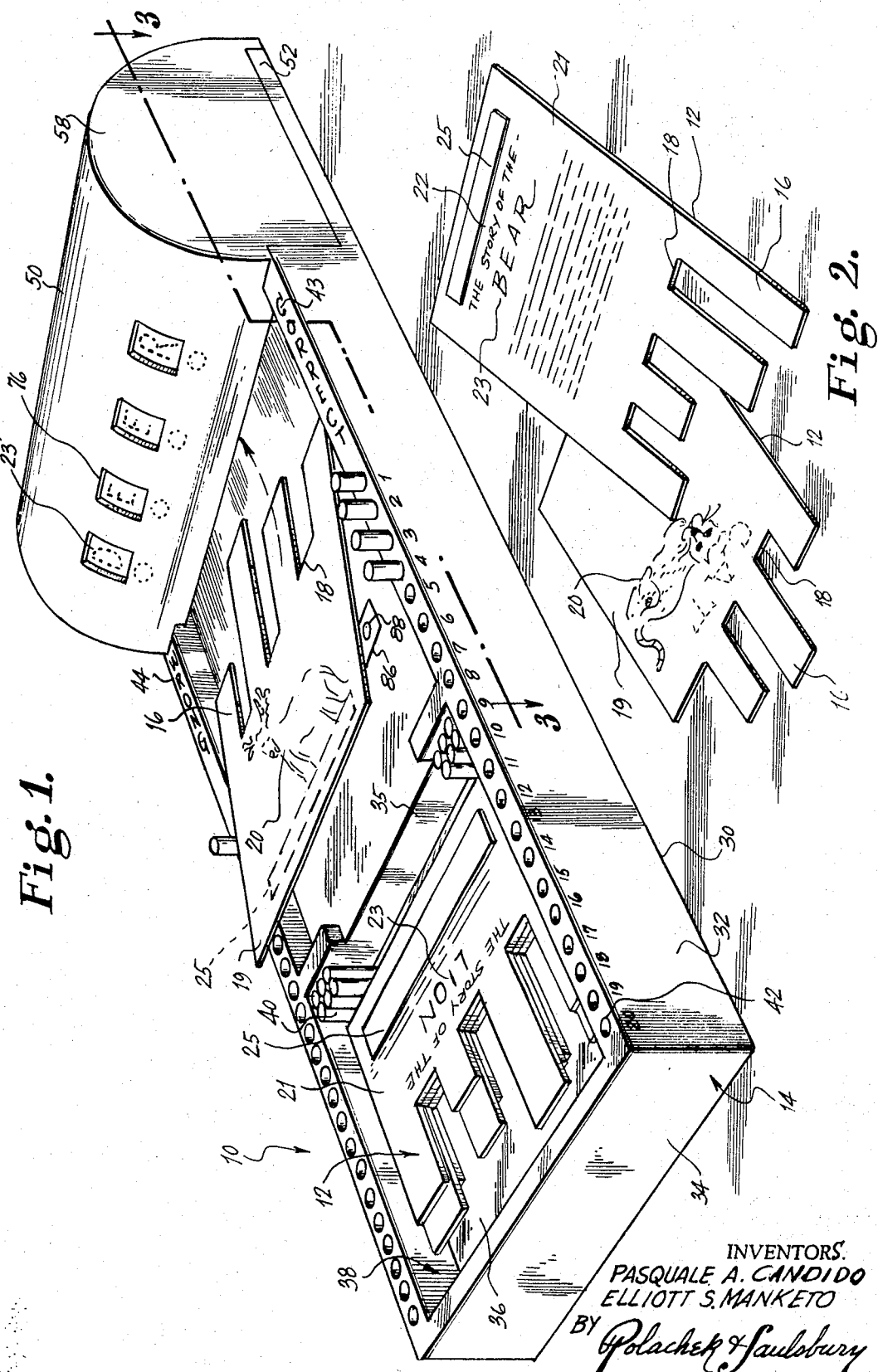

INVENTORS
PASQUALE A. CANDIDO
ELLIOTT S. MANKETO
BY
Polachek & Saulsbury
ATTORNEYS.

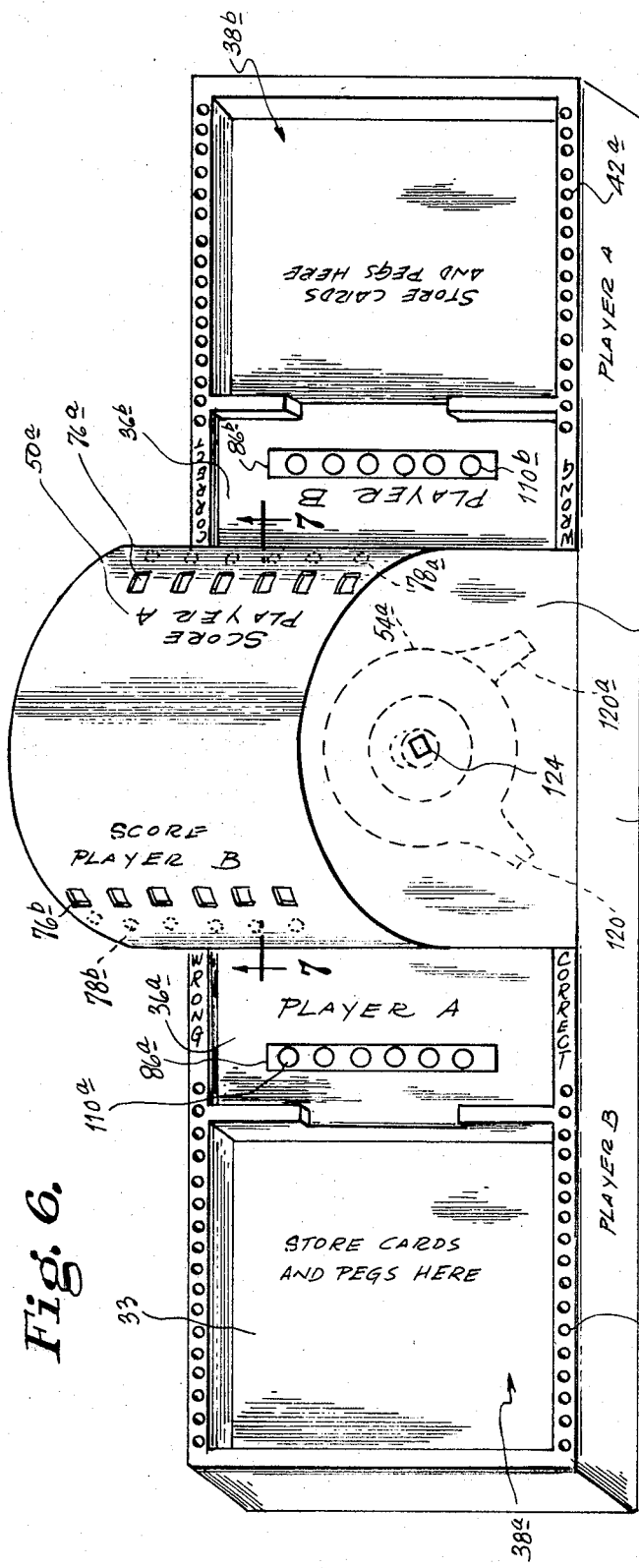
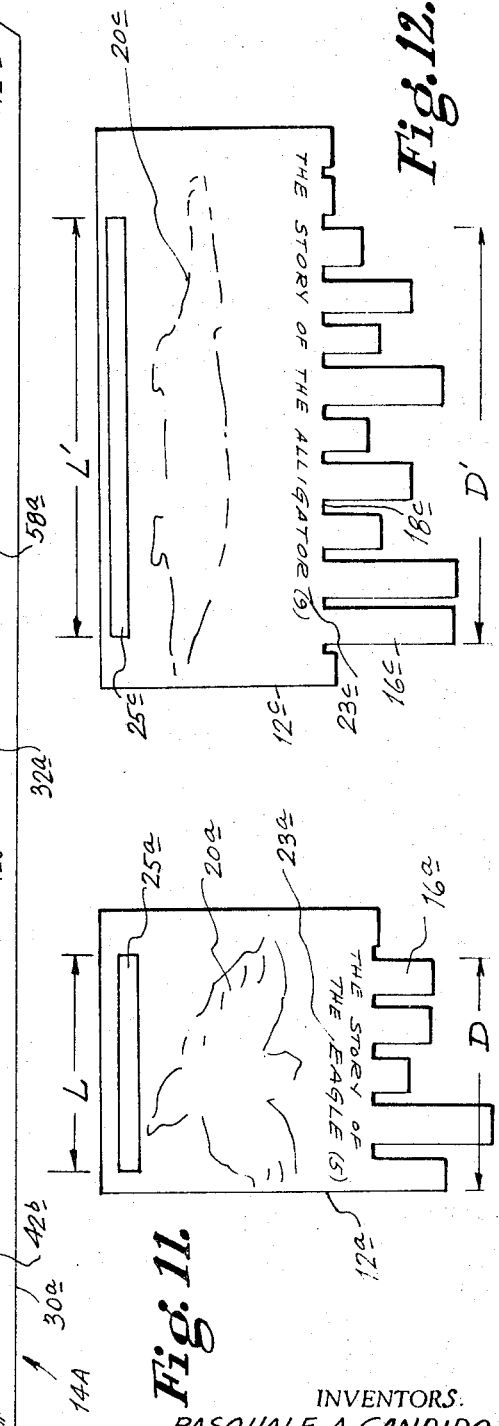

PATENTED JUL 20 1971 3,593,431

INVENTORS
PASQUALE A. CANDIDO
BY ELLIOTT S. MANKETO

Polachek & Saulsbury
ATTORNEYS.

EDUCATIONAL CARD-READING TOY APPARATUS

The invention relates to the art of educational toys and games and more particularly concerns a card-reading device for identifying a figure inscribed on a picture card inserted into the device.

This invention involves improvements over prior card-recognition devices which require a player to compare or match a picture on a card with a picture on a rotatable roll in the device.

According to the invention, each playing card has a picture of an animal or other figure on one side and a plurality of fingers of different lengths projecting from one edge of the card. The lengths of the fingers correspond to letters inscribed on rotatable spring-loaded discs in a reading device into which the card is inserted to be read. The number of fingers corresponds to the number of letters in the name of the figure pictured on the card. The player is required to guess the name of the animal or other figure and the device identifies the figure by name to verify the guessed name. Alternatively, the player is required to spell the name of the figure on the picture card, and the device provides the correct spelling. Pegs are provided for scoring correct and incorrect answers. The other side of the picture card is inscribed with a description or story relating to the pictured figure on the card.

The device in which the picture card is read may be provided with lamps to light up the letters which appear at windows in the device. The picture card may be provided with an electrical conductor to form part of the electric circuit for the lamps. This conductor may have a length corresponding to the number of letters in the name of the figure on the picture card. The device can be arranged to display any number of letters, preferably from 3 to 12, and cards used with the device may have any number of fingers up to the maximum number read by the device.

The card-reading device can be arranged for two players to use it alternately or simultaneously. Each player will read a name display of a picture card inserted in the device by the other player and will score the other player for correct identification of the figure on his picture card or for correct spelling of the name of the figure.

The invention will be explained in further detail in connection with the drawing, wherein:

FIG. 1 is a perspective view of one toy assembly or apparatus, including picture cards and a card-reading device according to the invention.

FIG. 2 is a perspective view of two cards used in the device of FIG. 1.

FIG. 6 is a perspective view of another card-reading device.

FIG. 11 is a plan view of a picture card readable in the device of FIGS. 6-9.

FIG. 12 is a plan view of another picture card.

Figure 3:
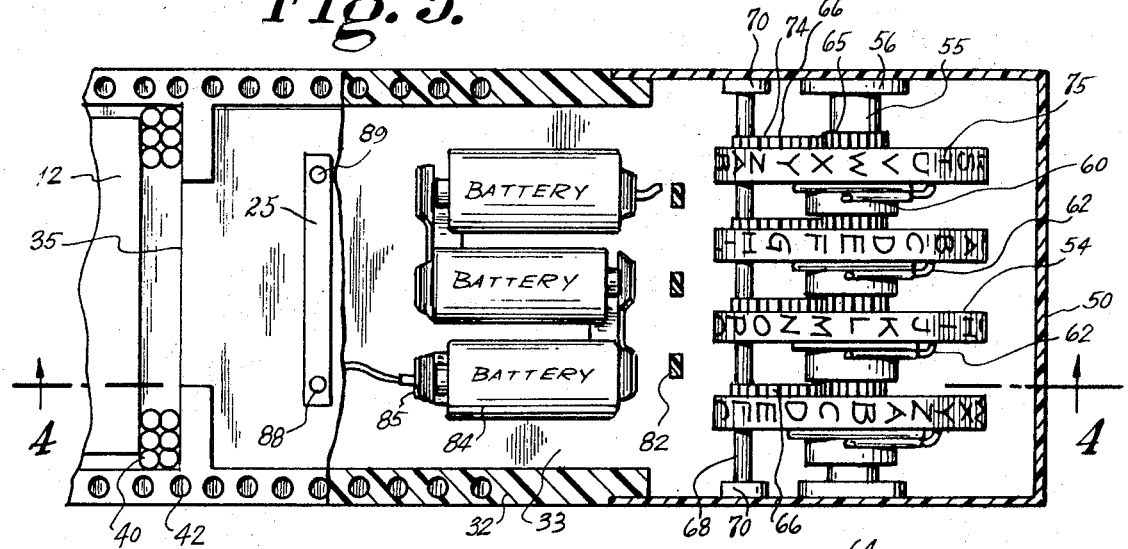
FIG. 3 is a fragmentary horizontal view taken on line 3-3 of FIG. 1.
Figure 4:
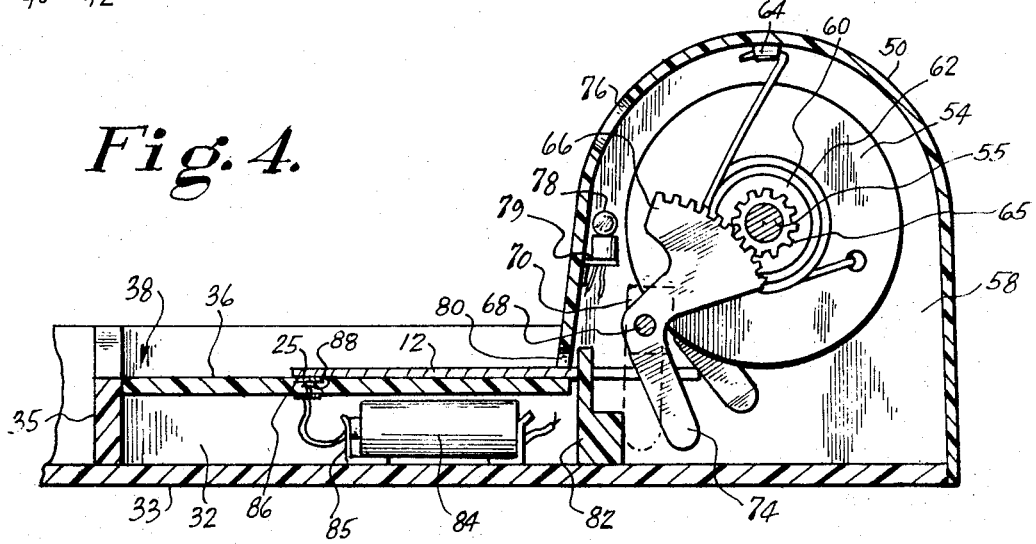
FIG. 4 is a fragmentary vertical sectional view taken on line 4-4 of FIG. 3.

Referring first to FIGS. 1-4 of the drawing, there is shown a toy assembly 10 including a plurality of picture cards 12 and a card-reading device 14. The cards 12 are each generally rectangular in form with rectangular spaced fingers 16 extending outwardly of one edge 18. The fingers are of different lengths. On one side 19 of each card is a picture 20 of an animal or other figure. On the other side 21 of the card is inscribed a description 22 of the figure together with the name 23 of the figure pictured on side 19. Adjacent edge 24 of the card on side 21 is an electrically conductive strip 25 which may be metal foil secured by a suitable adhesive.

The device 14 in which the cards are read individually includes an elongated rectangular base 30 having vertical sidewalls 32, a bottom wall 33, end wall 34, intermediate vertical wall or partition 35, and horizontal platform 36 spaced from bottom wall 33. A compartment 38 is defined between walls 32, 34 and 36 in which cards 12 can be stored. A plurality of pegs 40 can also be stored in compartment 38. These pegs can be inserted into holes 42 formed in the tops of walls 32 for scoring the play. "CORRECT" and "WRONG" markings 43, 44 and numerals 48 on the sidewalls adjacent the holes 42 are useful in scoring the play.

A curved hood 50 is removably mounted at end 52 of the base. In the hood is a plurality of axially horizontal vertically turnable discs 54. The discs are rotatably supported on a shaft 55 carried by brackets 56 at vertical end walls 58 of the hood. Each disc has a hub 60. Engaged on the hub is one end of a coil spring 62. The other end of each spring is engaged in an eye 64 at the underside of the top of the hood. Integral with each disc is a spur gear 65 engaged by a sector gear 66. Each gear 66 is pivotally supported on a stationary rod or shaft 68 carried by end plates 70 on end walls of the hood. Each sector gear has a depending lever 74 which can be tilted inwardly of the hood to turn the gear and associated disc against tension in a coil spring 62. On the periphery of each disc is inscribed a plurality of letters 75. The letters are keyed to names 23 of the figures on cards 12.

Adjacent each disc is a window 76. In these windows appear selected letters 75 depending on the extent of angular rotation of the discs. A lamp 78 is mounted on a bracket 79 adjacent to each window to illuminate the letter thereat. A space 80 is provided under the forward edge of the hood into which a card 12 can be inserted as clearly shown in FIG. 4. A plurality of spaced abutments 82 mounted on bottom wall 33 extend upwardly and are disposed in planes between the vertical discs to align fingers 16 of the inserted card with legs 74 of the sector gears.

Batteries 84 are disposed under platform 36 and are mounted in spring brackets 85. The batteries are connected in circuit with the lamps 78. On platform 36 is a shallow recess 86 in which are located two fixed electrical contacts 88, 89 connected in circuit with the batteries and lamps. The recess 86 receives the electrically conductive strip 25 which bridges the contacts 88, 89 when a card 12 is fully inserted into device 14 (see FIG. 4).

Figure 5:
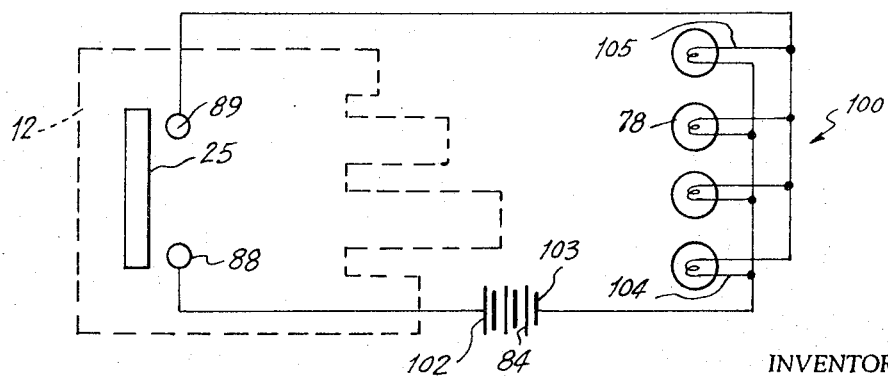
FIG. 5 is a diagram of the electric circuit employed in the device.

FIG. 5 shows circuit 100 of device 14. It will be noted that batteries 84 have one terminal 102 connected to contact 88 and the other terminal 103 connected to one terminal 104 of each lamp. The other terminal 105 of each lamp is connected to contact 89. The lamps are normally extinguished and will light when conductive strip 25 on a card 12 bridges contacts 88, 89.

In operation of the assembly, a young player, such as a child of preschool or elementary school age will insert a card 12 with picture side 19 upwards into the device. He will push the fingers 16 into the device as far as they will go. The sector gears and discs will turn to show in windows 76 name 23' of the figure 20 pictured on the card. If desired, the child can first read the description of the figure on side 21 of the card and then he will turn over the card to show only the picture of FIG. 20 and will try to spell the name of the figure. He will then verify the spelling as shown by name 23' at windows 76. Alternatively, a very young child can be asked to guess the name 23 of the animal or other figure shown on the card. Then he can verify the name by reading name 23' in windows 76. If desired, an older person can read the name 23' for the child. Score is kept of correct and wrong answers by means of pegs 40 which are inserted in turn at numbered holes 42.

Cards 12 and device 14 is shown set up with only four discs, so only three-letter and four-letter names will appear at windows 76. If longer names are desired, then more discs 54, up to a maximum of 12 or 30, may be provided with a corresponding number of windows 76 and with each card 12 having a number of fingers 16 corresponding to the number of letters in the name of FIG. 20 on the card up to a maximum of 12 letters. Card 12' shown in FIG. 2 has only three fingers 16 because FIG. 20 is that of a cat which has only three letters in its name.

FIGS. 6—9 show another toy or game device 14A which can be used by two players. Parts corresponding to those of device 14 are identically numbered. In device 14A, base 30a has two compartments 38a, 38b at opposite ends for storing picture cards. Players can place cards on platforms 36a, 36b and insert them through slots 80a, 80b at both sides of hood 50a. This hood has two sets of six windows 76a, 76b on opposite sides. The windows are staggered with respect to each other. In recesses 86a, 86b in the platforms are spaced fixed electrical contacts 110a, 110b. Sidewalls 32a of the base are extended so that the hood is located between opposite ends of the device. Holes 42a and 42b are provided at opposite ends of the tops of walls 32a for inserting pegs 40 in scoring play.

Inside the hood are abutments 82a, 82b which serve as stops for the picture cards when inserted into the hood. Adjacent the abutments are depending levers 120a, 120b of two sets of discs 54a, 54b. The discs are alternately disposed on crossshaft 122 which has rectangular ends 124 set in holes 125 in the sidewalls 58a of the hood. On shaft 122 are 12 nonrotatable spacer discs 126a and 126b held by keys 128 on shaft 122. The keys extend into a groove 130 extending longitudinally of shaft 122. The discs 54a and 54b are rotatable on the shaft. Coil springs 62a and 62b are wound oppositely on the spacer discs and are alternately disposed. One end of each spring 62a is engaged on a disc 126 and the other end is engaged on a disc 54a. One end of each spring 62b is engaged on a disc 126b and the other end of the spring is engaged on a disc 54b. Letters 75a, 75b are inscribed on the peripheries of the discs and are exposed at windows 76a, 76b, respectively. Lamps 78a, 78b are mounted on brackets 79 adjacent the windows for illuminating the letters thereat. When picture cards are inserted into the hood at opposite sides, the fingers of the cards engage levers 120a, 120b and rotate discs 54a, 54b in opposite directions. The discs are returned to normal positions shown in FIGS. 7 and 8 when the cards are removed from the device.

Figure 8:
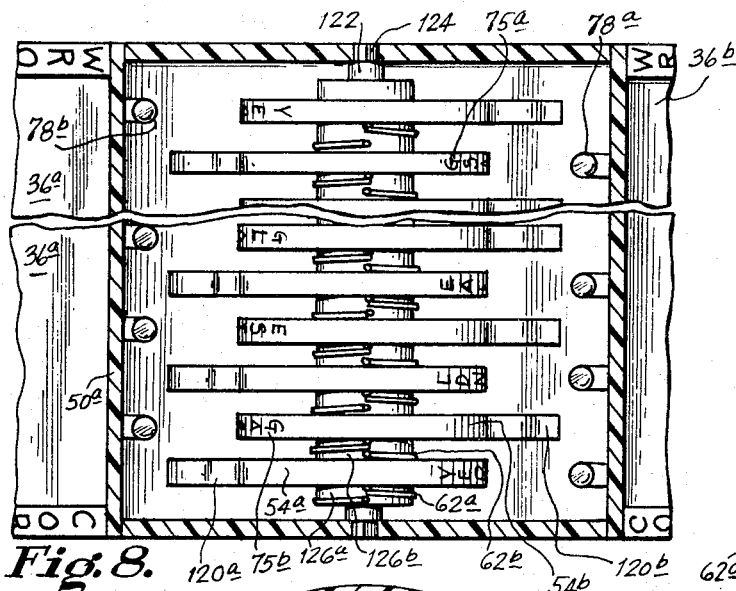
FIG. 8 is an enlarged horizontal sectional view with part broken away taken on line 8-8 of FIG. 7.
Figure 7:
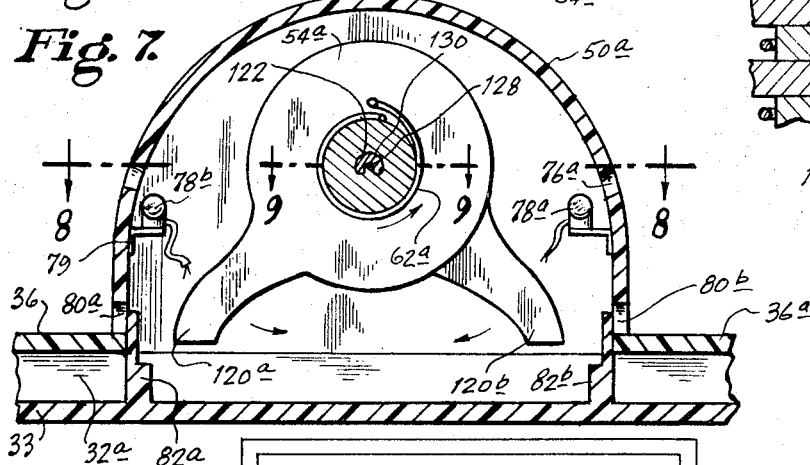
FIG. 7 is a fragmentary vertical sectional view taken on line 7-7 of FIG. 6.
Figure 9:
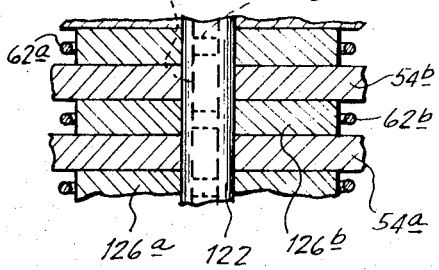
FIG. 9 is an enlarged fragmentary horizontal sectional view taken on line 9-9 of FIG. 7.
Figure 10:
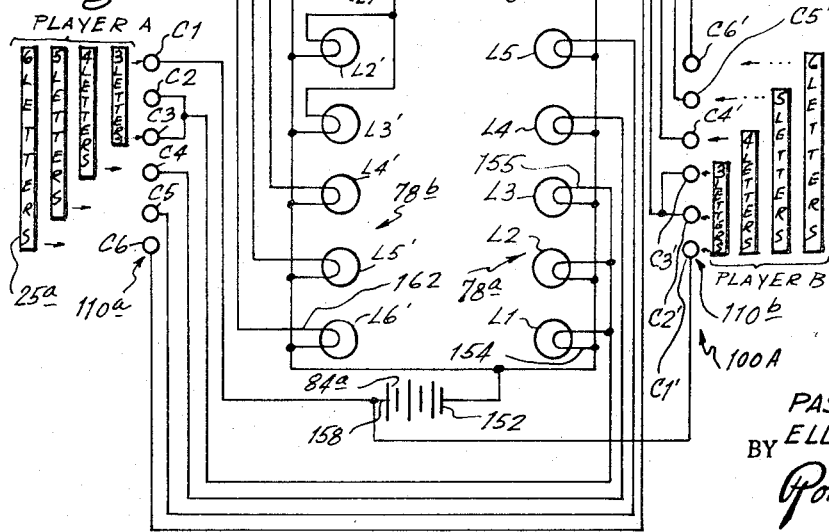
FIG. 10 is a diagram of the electric circuit of the device of FIGS. 6-9.

It will be noted that the letters 75a on discs 54a are exposed at windows 76a at the right side of the hood as viewed in FIGS. 6, 7 and 8. This is the playing position of player B. Similarly, letters 75b on discs 54b are exposed at windows 76b on the left side of the hood as viewed for reading by player A. By this arrangement when player B inserts a card at the right side of the hood 14A, player A will read the name which appears in windows 76b at the left side of the hood. When player A inserts a card at the left side of the hood, player B will view the name which appears at windows 76a at the right side of the hood. Lamps 78a and 78b illuminate windows 76a, 76b respectively. These lamps are arranged so that only those lamps will light for which letters appear at the appropriate windows. For example, if a figure on a card has a name with four letters, then only four letters will appear at windows 76a or 76b and only four lamps at these windows will light. This is made possible by circuit 100A of device 14A shown in FIG. 10 to which reference is now made.

In circuit 150 batteries 84a have one terminal 152 connected to one terminal 154 of each lamp. Three lamps L1, L2 and L3 of the group of lamps 78a at the right side of the hood have terminals 155 connected together to contacts C2 and C3 of the left group of contacts 110a. Lamps L4, L5 and L6 have terminals 155' connected to individual contacts C4, C5 and C6, respectively. Contact C1 is connected to terminal 158 of the batteries. Contact C1' in the right group of contacts 100b is also connected to terminal 158. Contacts C2' and C3' are connected together to terminals 160 of lamps L1', L2' and L3'. Contacts C4', C5' and C6' are connected to terminals 162 of lamps L4', L5' and L6'.

Cards 12a such as shown in FIG. 11 have conductive strips 25a whose length L corresponds to the width D of the card at the fingers 16a. The number of fingers and the width of the card at the fingers depends of course on the number of letters in name 23a of the FIG. 20a on the card. Thus a card having six fingers and six letters in name 23a will have a conductive strip 25a which covers all six contacts C1—C6 or C1'—C6'. A card with five fingers will cover five contacts, etc. A card with three fingers is the minimum one which will be accommodated, since no card will have a pictured figure with less than three letters in its name.

In operation of device 14A, if player A inserts a card 12a at the left side of hood 50a, three, four, five or six discs 54a will turn depending on the number of fingers on the card. Then only three, four, five or six lamps 78a will light up at the right side of the hood to illuminate letters 75b at windows 76b. Player A will then call out the name of the figure on his card or will spell the name of this figure and player B to whom the name of the figure is displayed at windows 76b will verify the name or spelling and insert a peg in one of holes 42a. Similarly, player A will verify the name or spelling of the figure on the card which player B inserts into the device at the right side of the hood and will insert a peg in one of holes 42b. In each case only those lamps will light for which corresponding letters appear at windows 76a or 76b. When the cards are withdrawn springs 62a, 62b will return the discs 54a, 54b to their centered normal positions where no letters are exposed at the windows.

It is of course possible to manufacture devices 14 and 14A without the electric circuitry and lamps, but in more elaborate toy and game assemblies, the lamps will be provided.

Device 14A has six windows on each side. Of course more than six windows can be provided. If the device has as many as 12 windows on each side, a wider card such as card 12c shown in FIG. 12 can be used. This card has only nine fingers 16c because the alligator FIG. 20c illustrated in dotted lines has only nine letters in its name 23c. Conductive strip 25c has a length L8 corresponding to the width D' of the nine fingers provided at edge 18c of the card. Other cards may be provided with from 3 to 12 fingers.

The devices in simplified form or in more complex and elaborate arrangements all have the common characteristic of displaying the name of a pictured figure on a card which has fingers of different lengths corresponding to letters which appear on the rotatable discs at windows in the device. The devices are simple to use and can be served as teaching machines as well as entertainment devices for young children.

What we claim: is:

1. A toy apparatus for displaying the names of figures pictured on cards each having a plurality of fingers of different lengths corresponding to particular letters in the name of the figure on the card, said apparatus comprising a generally rectangular base, a hood on said base, a plurality of discs rotatably disposed in said hood, a platform on the base at one end of the hood for supporting one of said cards while the same is inserted into the hood, and mechanical means engageable by said fingers and operatively arranged to rotate the discs angular distances depending on the lengths of said fingers, said discs having letters inscribed on peripheries thereof, said hood having windows arranged to display the letters on said discs whereby letters displayed at said windows correspond to the particular letters in the name of the figure on the card inserted into said hood, another platform at the other side of the base for supporting another one of said cards while the same is inserted into the hood at the other side thereof; other discs rotatably disposed in the hood, and further mechanical means engageable by the fingers of said other card and operatively arranged to rotate the other discs, said other discs having other letters inscribed on peripheries thereof, said hood having other windows arranged to display said other letters on the other discs whereby the other letters displayed at said other windows correspond to the particular letters in the name of the figure on the other card when the same is inserted into said hood, said first named windows being located at said other side of the hood for viewing by a player positioned at said other side of the hood, and said other windows being located at said one side of the hood for viewing by another player positioned at said one side of the hood.

2. A toy apparatus as defined by claim 1, further comprising a plurality of lamps disposed adjacent the respective windows; and circuit means activated by said card to illuminate the lamps when the card is inserted into the hood.

3. A toy apparatus as defined by claim 1, wherein each card has an electrically conductive strip thereon, said apparatus further comprising a plurality of lamps disposed adjacent the respective windows; a power supply including batteries in said base connected in circuit with said lamps; and electrical contacts on said platform connected to said circuit and arranged for bridging by the conductive strip to illuminate the lamps when the card is inserted into the hood.

4. A toy apparatus as defined by claim 1, wherein said mechanical means comprises spring means biasing the discs to initial stationary positions; gear means secured to the discs; lever means engageable by said fingers on the card; and sector gears carried by said lever means and engaged with said gear means for rotating the discs when the card is inserted into the hood.

5. A toy apparatus as defined by claim 1, wherein said mechanical means comprises spring means biasing the discs to initial stationary positions; and lever means carried by the discs and disposed for engagement by said fingers of the card when the card is inserted into the hood.

6. A toy apparatus as defined by claim 1, further comprising lamps disposed adjacent the windows in the hood; and circuit means activated by the cards to illuminate the lamps at those windows where letters on the discs corresponding to letters of names of figures on the cards are displayed.

7. A toy apparatus as defined by claim 6, further comprising electrical contacts, wherein each of said cards has a conductive strip thereon, said apparatus further comprising contacts on the respective platforms arranged for bridging by conductive strips on the cards and connected in circuit with the lamps in such a way that only those lamps light up which are disposed adjacent to windows where letters on the discs are displayed.